Feb. 20, 1968  W. R. LIGHT, JR  3,370,215
STEP UP CYCLOCONVERTER WITH HARMONIC DISTORTION REDUCING MEANS
Filed Feb. 9, 1966
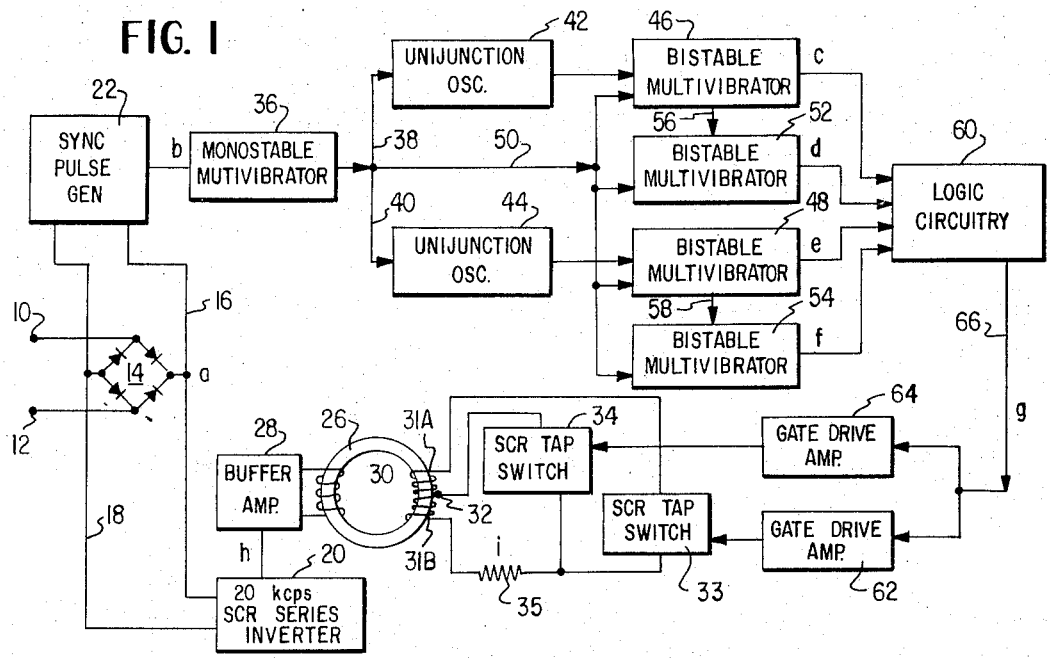
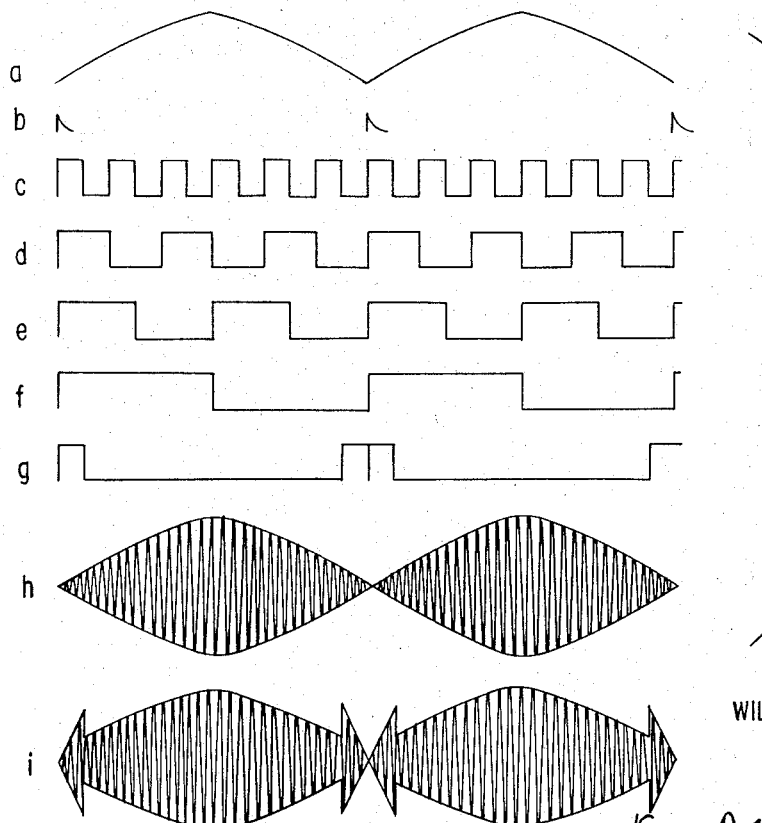
INVENTOR
WILLIAM R. LIGHT, JR.
ATTORNEYS.

3,370,215
STEP UP CYCLOCONVERTER WITH HARMONIC DISTORTION REDUCING MEANS
William R. Light, Jr., Charlottesville, Va., assignor to Basic, Incorporated, Cleveland, Ohio, a corporation of Ohio
Filed Feb. 9, 1966, Ser. No. 526,124
7 Claims. (Cl. 321—4)

This invention relates to a solid state step up cycloconverter for converting low frequency alternating current into high frequency alternating current.

Prior art methods of accomplishing an energy conversion from low frequency to high frequency include motor generator sets, saturable reactor circuits, and rectifier-inverter combinations. Such devices are bulky because they require large amounts of iron in either their construction or their components.

There are many industrial power applications where frequencies higher than commercial line frequencies are either needed or lead to definite advantages in equipment design. Induction heating is one example of the application of high frequency power. It is well known that properties of power system components, such as size and weight, are directly related to operating frequency. In many applications it is worthwhile to convert the frequency of the incoming power merely to take advantage of the improved physical characteristics of a system's components such as transformers and filter parts. In addition, high frequencies make possible improved system dynamic performance such as rise and fall time.

Accordingly, it is an object of this invention to provide a circuit for changing low frequency alternating current power into high frequency alternating current power.

It is another object of this invention to provide a frequency converter utilizing electronic elements for converting low frequency AC to high frequency AC without utilizing a direct current link.

It is another object of this invention to provide new and novel means for the frequency conversion of low frequency AC to high frequency AC utilizing alternating current circuits to provide a distortion-free high frequency, high energy alternating current output.

These and other objects and advantages of the invention will become more apparent in the detailed description of the invention taken with the accompanying drawings, in which:

FIGURE 1 is a block diagram of a step up cycloconverter.

FIGURE 2 is a wave form diagram keyed to specific points in the block diagram of FIGURE 1.

The objects of this invention are accomplished through a unique and novel combination of AC pulse circuits including an inverter and multi-tap transformer connected across a low frequency AC source to provide a step up cycloconverter that may be utilized as a source of substantially distortion-free high frequency alternating current power. The inverter and pulse circuits are connected to a transformer and to a source of low frequency AC. The transformer is utilized as a filter and for this purpose it is provided with a number of taps which may be located on either its primary or secondary winding. The output of the transformer is connected either directly or through a passive filter to a load. The pulse circuits are also connected to the tapped winding of the transformer and are utilized for the purpose of changing the taps to which power is either applied to or form which power is taken. The changing of the tap sequence is synchronized with the frequency of operation of the low frequency power source for the purpose of utilizing the transformer as a filter.

Referring now to FIGURES 1 and 2, a specific embodiment of the invention will be described with reference to block and wave form diagrams. A low frequency source of power, e.g. a 60-cycle source, is applied over a pair of lines 10 and 12 to the input of a full wave bridge rectifier 14. The output of the rectifier 14 is applied over a pair of lines 16 and 18 to an inverter 20, and is also applied to the input of a pulse generator 22.

The inverter may be any type which has a capability of converting low frequency AC into high frequency AC. In the preferred embodiment of this invention, the inverter comprises a class A two silicon controlled rectifier series inverter. Silicon controlled rectifiers will hereinafter be referred to as SCR's. For the purpose of this description, it will be assumed that it is desired to increase the 60-cycle source to an output frequency of 20 kc.p.s. In this case, the gates of the SCR's used in the inverter are driven at a frequency of 20 kc.p.s.

The inverter operates as a power source where the frequency of the output is 20 kc.p.s. However, the output waveform also has a 60 c.p.s. modulation envelope or component as shown in FIGURE 2h. The low frequency component would represent distortion in the power supplied to a load in that the amplitude of the supplied power would vary in accordance with the low frequency source. Thus if the AC inverter is to act as a source of high frequency power the modulation envelope must be removed or filtered. The circuits described below are used in conjunction with the low frequency source and the inverter to substantially remove the modulation envelope to provide low frequency filtering action and a power waveform to the load as shown in FIGURE 2i.

In the preferred embodiment of this invention, the inverter 20 is connected to a primary winding 24 of a step up transformer 26 through a buffer amplifier 28. The buffer is utilized to amplify the inverter output and provide an impedance match to the transformer 26. For these functions the buffer amplifier 28 may consist of a suitable number of cascaded amplifiers, e.g. two stages, and in addition, may consist of any suitable impedance matching means. In the preferred embodiment of this invention, a pair of conventional transistor amplifiers are cascaded with the output transistor of the amplifier being an emitter follower. The impedance matching stage consists of a pair of transistors utilizing positive and negative feedback for the purpose of obtaining the impedance match. The transistors of the impedance matching stage are connected in series, emitter to collector, across a DC source with the primary winding 24 being connected between the emitter-collector junction and a reference; the emitter follower output is applied to the base of the input transistor of the impedance match pair.

It will be understood of course that the buffer amplifier 28 with an impedance match between the transformer 26 and the inverter 20 has been described because the inverter, being of a Class A SCR series type, is sensitive to changes in a load. If inverters not having this characteristic are utilized in the described combination then the buffer amplifier becomes unnecessary, that is to say, the buffer 28 would not be required.

The transformer 26 is shown having a fixed number of turns primary coil 24, and a multi-tap secondary coil 30. It is to be understood, of course, that for the purposes of this invention, the primary coil could have been provided with a plurality of taps with the secondary coil being of a fixed number of turns. For some applications, this may be more desirable if an SCR inverter is utilized in that high-current, low-voltage SCR's could be employed with the transformer. The transformer 26 is used for the purpose of filtering out the distortion envelope from the output of the inverter 20 to provide high frequency, distortion-free power to a load.

The secondary 30 is shown having a center tap 32. An SCR tap switch 33 is connected to one end 31A of secondary 30, and a second SCR tap switch 34 is connected to tap 32. The SCR tap switches 33, 34 each consist of a pair of SCR's connected in parallel and back to back. A load 35 is shown connected between the tap switches 33, 34 and the other end 31B of the secondary 30. In operation, the turns ratio of the transformer 26 is varied in synchronism with the low frequency source so that when the waveform of the low frequency source is at or near a zero reference level the tap switch 33 is activated to apply the full step up turns ratio of the secondary across the load. As the output of the low frequency source approaches a maximum, see FIGURE 2a, the tap switch 33 is deactivated and the tap switch 34 is activated to apply a lesser number of turns of the secondary across the load 35.

Of course, the secondary, or in the alternative the primary, could be provided with any number of taps and corresponding tap switches, but for the purpose of this description two taps and their corresponding tap switches will suffice. The manner in which the switches 33 and 34 are activated will be described below.

In order that the output waveform will have a constant peak amplitude across the load, it is necessary that the taps on the transformer 26 be varied instantaneously in accordance with and synchronized to the low frequency source. To achieve this, the pulse generator 22 is connected across the full wave bridge rectifier so that it is powered by the same source of low frequency as the inverter 20. The pulse generator 22 produces a pulse output as shown in FIGURE 2b for every zero point in the rectified waveform shown in FIGURE 2a. The pulse generator 22 may be any conventional spike waveform generator and in the preferred embodiment consists of a plurality of silicon diodes connected in series across the rectifier 14. The diodes are connected in parallel with an RC high pass filter and in series with a current limiting resistor. The diodes present a constant low voltage source across the RC network during the positive portion of the output of the bridge rectifier 14. At the instant the input waveform becomes lower than the low voltage across the diodes, the capacitor of the high pass RC filter begins rapidly discharging. This produces a negative voltage on the base of a PNP transistor, switching it on. As the rectified waveform of FIGURE 2a goes positive, the capacitor is rapidly charged and the transistor is switched off to produce the pulse shown in FIGURE 2b.

The output of the pulse generator 22 is connected to a monostable multivibrator 36 which multivibrator is triggered by the pulses produced by the pulse generator 22. A stage of amplification may be inserted between the generator and the multivibrator. The monostable multivibrator 36 may be of any conventional design. It may be convenient for some applications to include means within the multivibrator 36 to adjustably delay the spike output of the generator 22 for phase control purposes. In such a case, the monostable multivibrator 36 is used to add a fixed delay to the pulses produced by the pulse generator to cause these pulses to begin precisely at the instant the input waveform goes to zero.

The multivibrator 36 is connected over a pair of lines 38 and 40 to a pair of timing devices 42 and 44. The timing devices 42 and 44 may be any conventional relaxation oscillator and in the preferred embodiment of this invention consist of unijunction transistor relaxation oscillators. In the preferred embodiment, the pulse output of the multivibrator 36 is capacitively coupled to the base of the relaxation oscillators 42 and 44 for the purpose of synchronizing the oscillators 42 and 44, to the 60-cycle source. The oscillators 42 and 44 are connected to a pair of bistable multivibrators 46 and 48.

The monostable multivibrator 36 is also connected to the bistable devices 46 and 48 over a line 50, and in addition, the multivibrator 36 is connected to a second pair of bistable multivibrators or flip-flops 52 and 54, over the line 50. The multivibrator 46 is connected over a line 56 to the flip-flop 52. In a like manner the multivibrator 48 is connected to the flip-flop 54 over a line 58.

The bistable multivibrators are conventional transistor flip-flops, and are utilized for dividing the 60-cycle input into a plurality of output waveforms, which output waveforms are synchronized to the input. Thus, in the preferred embodiment, the output of the flip-flop 46 is a pulse train having a periodicity of 12 times that of an input cycle, as shown in FIGURE 2c. The period of multivibrator 52 is 6 times that of the input frequency as shown in FIGURE 2d. The rate of flip-flop 48 is four times that of the input frequency and the repetition rate of the flip-flop 54 is twice that of the input frequency. It is understood, of course, that the rates at which the bistable devices 46, 48, 52 and 54 operate, are described with reference to the two-tap transformer case. In the event that more taps are utilized or in the event that a different frequency of output power is chosen, different numbers of bistable devices will be necessary and their corresponding operating frequencies will change.

The outputs of the flip-flops 46, 48, 52 and 54 are applied in parallel to conventional logic circuitry, indicated by the block 60, for the purpose of combining pulse trains to produce signals for driving the SCR tap switches. In the preferred embodiment of this invention, the logic 60 consists of parallel AND and NAND circuits with their outputs connected to drive a pair of tap switch driving circuits 62 and 64 over a line 66. The logic output waveform for the two tap case is shown in FIGURE 2g, and consists of the additive output of the AND and NAND circuits.

The drive circuits 62 and 64 are utilized to operate the tap switches 32 and 34 to be fired in synchronization with the low frequency source. In the preferred embodiment of the present invention the gate drive circuitry consists of a combination of amplifiers and oscillators which are turned on or off depending upon the condition of input to their circuits. Thus the driver 62 is operatively connected to tap switch 33 for the purpose of applying the full turns ratio of the secondary 30 to the load 35. In a like manner tap switch 34 is operated by the driver 64 to apply the lower turns ratio across the load. During this period the driver 62 must deenergize tap switch 33 and similarly driver 64 must deenergize tap switch 34 when the full turns ratio is applied to the load.

In the preferred embodiment the driver 62 consists of a transistorized switch connected so as to apply energy from the 20 kc.p.s. source that drives the inverter 20 to to a conventional amplifier. The switch is connected to the output of the logic 60. The amplifier is utilized to drive the primary of a pulse transformer where the secondaries of the transformer are connected across the gates and cathodes of the SCR's comprising the tap switch 33. In some applications it may be convenient to include means within the drive circuits 62 and 64 to adjustably delay the beginning of the gate drive pulse for phase control purposes.

The driver 62 is responsive to the pulsed output of the logic 60. As is evident from FIGURE 2g the logic 60 produces a pulse when the input to the pulse generator 22 is approximately of zero value. The duration of the pulse shown at FIGURE 2g is dependent on the amount of filtering desired in that the duration of the pulse determines the period of application of the full step up turns ratio of the transformer 26.

In a similar manner the driver 64 comprises a switching transistor coupled to the logic 60 and amplifier where the switching transistor is utilized to apply a 20 kc.p.s. source to the amplifier whenever the output of the logic is of zero value. The driver 64 is coupled to tap switch 36 through a pulse transformer having a pair of secondaries.

The preferred embodiment utilizes two tap switches to achieve the output waveform shown in FIGURE 2i. It is obvious that further filtering action can be obtained by increasing the number of tap switches and altering the synchronizing drive circuits correspondingly. In the alternative additional filtering may be obtained by introducing passive filters between the tap switches 33, 34 and the load 35.

Although a specific embodiment has been described utilizing specific circuitry it will be understood that the invention is not limited to the inverter and synchronizing circuits mentioned. Rather, any inverter and combination of circuits having the capability of providing cycloconverter action by filtering undesired harmonics from the output waveform through the use of a tap changer operating in synchronism with the low frequency source may be substituted for the circuits described. The only limitations are that conversion be achieved without a DC link; that the inverter is of the low AC to high AC type; and that the tap changer be synchronized to the low frequency source.

Having described a specific embodiment of my invention I claim:

1. A step up cycloconverter for converting low frequency alternating current to a high frequency alternating current comprising:
    (a) a source of low frequency alternating current;
    (b) means connected to said low frequency source for converting said low frequency to a higher alternating current frequency;
    (c) transformer means connected to said conversion means;
    (d) a load connected to said transformer means; and
    (e) means connected to said low frequency source and between said transformer means and said load for reducing harmonic distortion while increasing high frequency power output.

2. An electrical circuit according to claim 1 wherein said alternating current conversion means comprises a series inverter.

3. An electrical circuit according to claim 1 wherein said transformer means has a multi-tap winding.

4. An electrical circuit according to claim 1 wherein said means for eliminating harmonic distortion comprises:
    (a) a rectifier;
    (b) means connected to and synchronized with said rectifier for producing a series of pulses; and
    (c) switching means connected between said pulse generating means and said transformer means and responsive to said pulse generating means for controllably varying the output of said transformer means in a manner so as to reduce harmonic distortion while increasing high frequency power output.

5. An electrical circuit according to claim 1 wherein said means for eliminating harmonic distortion comprises:
    (a) a rectifier;
    (b) means connected to and synchronized with said rectifier for producing a series of pulses;
    (c) means connected to and responsive to the output of said pulse generating means for producing a plurality of pulse trains, where the period of each pulse train is determined by the period and sequencing of the pulses applied to the input of said means;
    (d) controllable unidirectional conducting devices connected to a plurality of points on a winding of said transformer means for selectively controlling the turns ratio of said transformer means; and
    (e) means connected to said pulse train means and said controllable unidirectional devices and responsive to the pulse trains for selectively energizing said controllable unidirectional devices.

6. An electrical circuit according to claim 1 wherein said means for reducing harmonic distortion comprises:
    (a) a rectifier connected to said source of low frequency alternating current;
    (b) a pulse generator connected to said rectifier for producing a pulsed output in synchronism with the output of said rectifier;
    (c) means connected to said pulse generator for producing a plurality of pulse trains in response to the output of said generator;
    (d) gating means connected to said pulse train producing means for combining said plurality of pulse trains to produce a signal output;
    (e) controllable unidirectional conducting devices connected to a plurality of points on a winding of said transformer means for changing the turns ratio of said transformer means; and
    (f) driving means connected between said gating means and said controllable unidirectional devices for controllably energizing said unidirectional devices in response to said signal produced in said gating means.

7. A step up cycloconverter for converting low frequency alternating current to high frequency alternating current comprising:
    (a) a source of low frequency alternating current;
    (b) a series inverter connected to said low frequency source for converting said low frequency AC to high frequency AC;
    (c) a transformer having its primary winding connected to said series inverter and having its secondary winding connected to a load, at least one of said windings having a plurality of taps and having a pair of silicon controlled rectifiers connected in back to back relationship to each tap;
    (d) a rectifier connected to said low frequency alternating current source for producing a pulsating DC output;
    (e) a pulse generator connected to said rectifier and synchronized with said rectifier to produce a pulse every time the pulsating DC has an instantaneous value of zero;
    (f) a plurality of clocked bistable multivibrators connected to and synchronized with said pulse generator for generating a plurality of pulse trains;
    (g) gating means connected to said clocked bistable multivibrators and responsive to said pulse trains for combining said pulse trains to produce a signal dependent on the periodicity of said pulse trains; and
    (h) driving means connected to said gating means and to said silicon controlled rectifiers and responsive to the signal output of said gating means for controllably energizing said silicon controlled rectifiers.

References Cited

UNITED STATES PATENTS

| | | | |
|---|---|---|---|
| 3,134,915 | 5/1964 | Ensink et al. | 307—105 X |
| 3,241,038 | 3/1966 | Amato | 321—9 X |
| 3,337,788 | 8/1967 | Pelly | 321—7 |

JOHN F. COUCH, *Primary Examiner.*

G. GOLDBERG, *Assistant Examiner.*